Oct. 14, 1930.     O. BECKER     1,778,140

LOADING FIXTURE FOR FILM HOLDERS

Filed Jan. 5, 1927     2 Sheets-Sheet 1

Oct. 14, 1930.  O. BECKER  1,778,140
LOADING FIXTURE FOR FILM HOLDERS
Filed Jan. 5, 1927  2 Sheets-Sheet 2
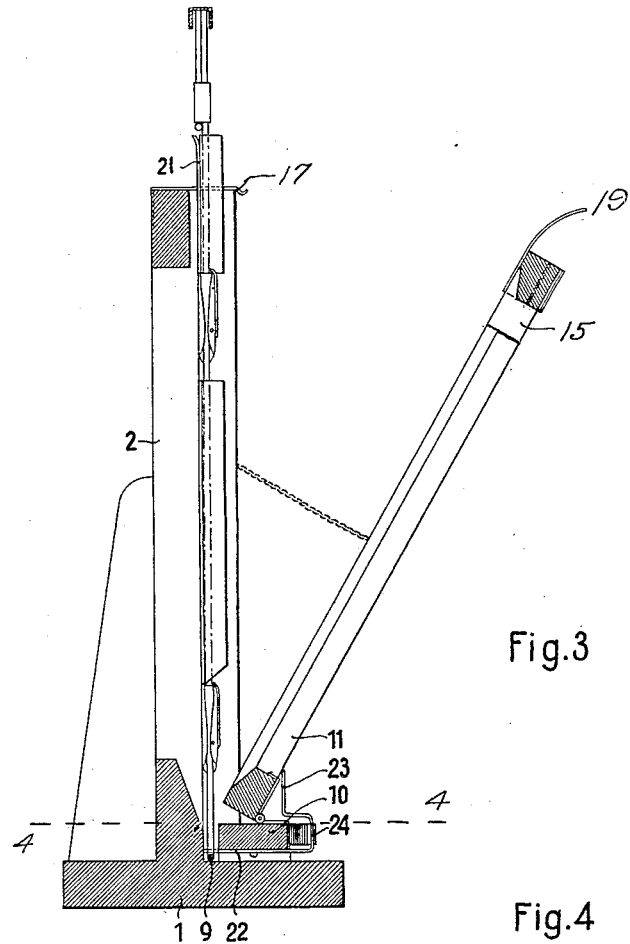
Fig.3
Fig.4
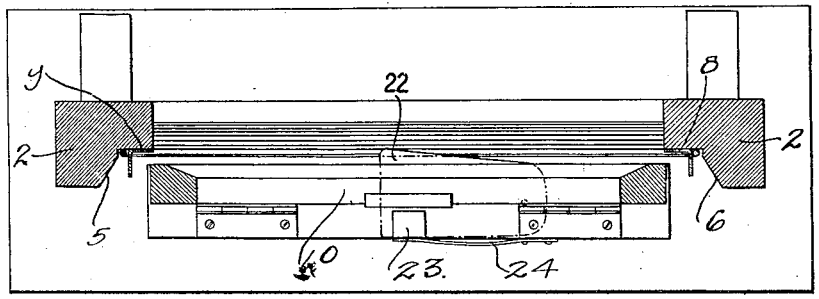
Inventor:
Oscar Becker,
By Byrnes Townsend & Brickenstein,
Attorneys.

Patented Oct. 14, 1930

1,778,140

UNITED STATES PATENT OFFICE

OSCAR BECKER, OF BERLIN-TREPTOW, GERMANY, ASSIGNOR, BY MESNE ASSIGNMENTS, TO AGFA ANSCO CORPORATION, OF BINGHAMTON, NEW YORK, A CORPORATION OF NEW YORK

LOADING FIXTURE FOR FILM HOLDERS

Application filed January 5, 1927, Serial No. 159,215, and in Germany May 5, 1926.

A certain amount of difficulty is found in inserting flat films without damage into the clamping devices of the holders used in the development of the film, since these films are generally coated with emulsion on both sides and are very sensitive to light and easily injured. Several plans have been proposed for obviating this difficulty, for example frames in which the film is temporarily placed and from which it can be withdrawn after it has been easily inserted into the holder.

The present invention relates to this type of insertion devices.

According to the invention, the loading fixture consists of a frame at the front surface of which guides are provided corresponding to the distance between the walls of the holder, and a hinged side of the frame in the closed position is folded against the vertical walls of the frame and secures the film holder in the said guides.

By this means the film holder is easily inserted in the frame, the film in the holder in which it is clamped, and the holder with the film is easily withdrawn from the loading fixture.

The film holder itself for which the loading fixture is suitable forms no part of this invention. It consists of a rectangular frame of which the upper cross member enables the frame to be handled in a bath. To the side members of this frame are secured clamping devices for the edges of the film to be gripped. The holder with these clamping devices is shown and particularly described in my U. S. Patent 1,672,925.

The accompanying drawings represent an example of a construction according to the invention, in which—

Fig. 3 is a vertical section with the hinged side of the frame open, and

Fig. 4 is a cross-section on the line 4—4 of Fig. 3 or Fig. 1.

Figure 1:
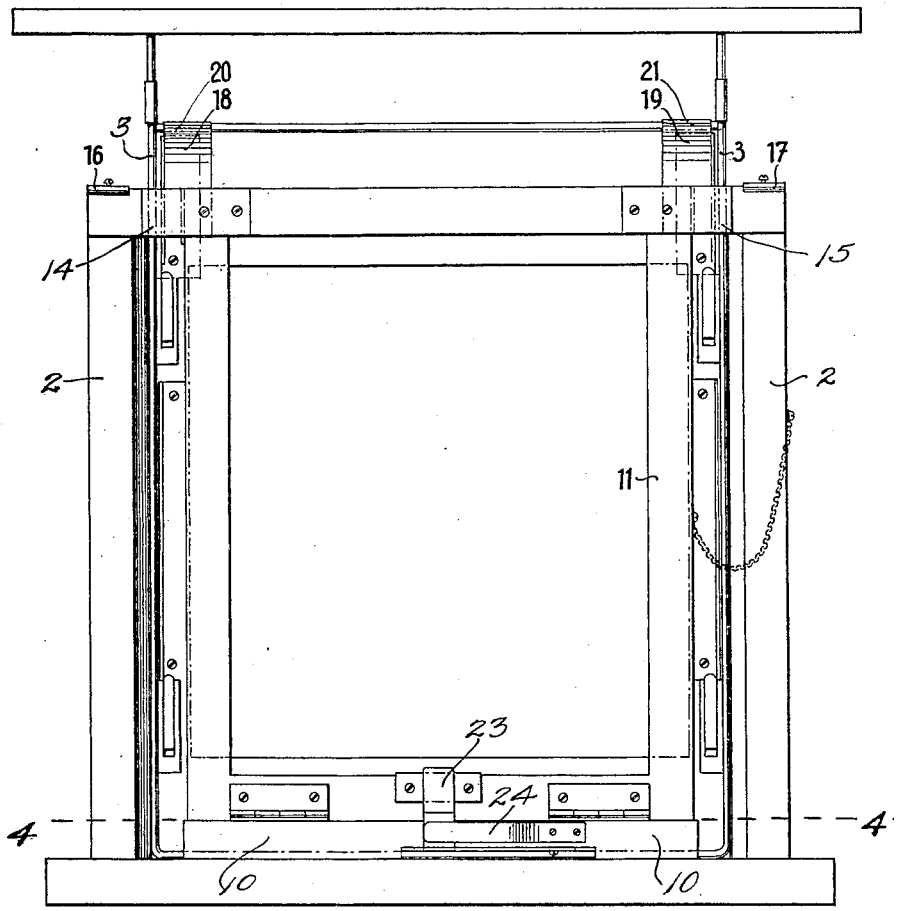
Fig. 1 shows the loading fixture with the holder inserted.
Figure 2:
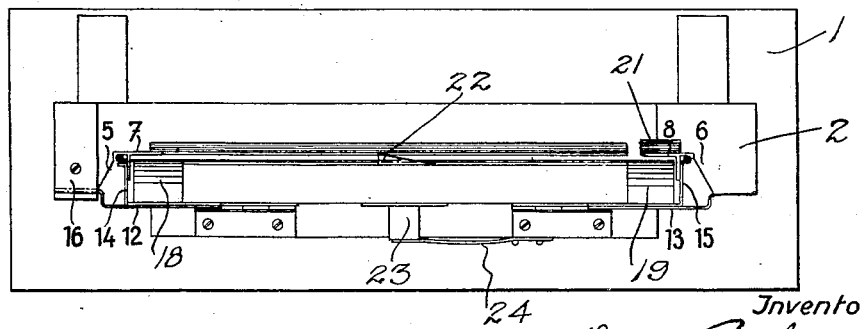
Fig. 2 is a plan.

The loading fixture consists of a base plate 1 with uprights 2. On the front side of the uprights guides or guiding grooves are provided for the side walls 3, of the holder. These consist of fillets 5 and 6 projecting from the uprights 2 and angle guides 7 and 8 by the side of the fillets at the distance apart corresponding to the width of the side walls of the holder, so that these side walls can be inserted from the front between the fillets 5, 6 and guiding devices 7, 8. In the holder a transverse strip 9 lies in the space between the base plate 1 and a horizontal transverse member 10 provided in the vertical frame slightly above the base plate. The member 10 serves also for the hinged mounting of a side 11 of the frame. At the walls 12 and 13 of the side 11 angle pieces 14 and 15 are provided of which one side in the closed position of the side 11 of the frame lies against the side walls 3 of the holder when it is inserted in the frame, so that the holder is securely held in this frame. In the closed position the side 11 of the frame is secured by spring catches 16 and 17 on the front surface of the uprights 2, which in the closed position lie over corresponding projections or edges on the front surface of the side 11. Also, near the side walls 3 of the holder bent down tongues 18 and 19 are provided on the side 11 of the frame which with corresponding tongues 20 and 21 of the holder form a slit in which the film is guided. The angle pieces 7 and 8 are arranged on the upright frame so that the inner surfaces of these angle pieces are in line with the inner surfaces of the external clamping walls of the holder which ensures that the film is exactly guided in the slits both in front and behind by the tongues 18, 20 and 19, 21, on the right and left along the angle guides 7 and 8, and along the clamping devices in the holder itself. By these means the film is easily inserted without damage to its sensitive surface.

In order to prevent the film during its insertion in the holder by means of the loading fixture from sliding over the cross strip 9 of the holder, a sliding stop 22 is arranged under the member 10 of the frame, which in the closed position of the side 11 slides over the strip 9 of the holder 3 by means of a leaf spring 24, but when the side 11 is opened, is displaced by means of an angular shoulder 23 of the sliding stop 22, contrary to the effect of the spring 24 secured to the frame 10; and lying against the sliding stop 22 (Fig. 3), so that the strip 9 of the holder is quite free, and the holder can be easily removed from the insertion device.

Having now particularly described and ascertained the nature of my said invention and in what manner the same is to be performed, I declare that what I claim is:

1. In a loading fixture for a rectangular film holder with clamping devices for the edges of the film, the combination of framework including a base plate having an upright thereon, a horizontal transverse member secured to said base plate in spaced relation to the upright thereof, whereby the lower transverse strip of the film holder may be placed between said horizontal member and the upright, and an open frame pivoted to said horizontal transverse member.

2. The structure as in claim 1 wherein a stop on said horizontal transverse member slides over the lower transverse strip of the film holder when said open pivoted frame is in closed position.

3. The structure as in claim 1 wherein a stop is spring-pressed into engagement with the lower transverse strip of said film holder, and means are provided on the pivoted frame for withdrawing said stop.

4. In a loading fixture for a rectangular film holder with clamping devices for the edges of the film, the combination of framework comprising a base plate, upright forming a fixed vertical frame, the front surface of which is provided with guiding grooves for the holder, arranged at the distance apart of the walls of the holder, a horizontal transverse member spaced from said uprights the distance of the thickness of the sidewalls of the holder, and a movable frame the lower horizontal part of which is connected to the horizontal transverse member by means of hinge-joints, whereby said frame can be swung up in closed position to the fixed vertical frame so as to secure the holder in the said guiding grooves.

5. In a loading fixture for a rectangular film holder with clamping devices for the edges of the film, the combination of a framework comprising a base plate, uprights forming a fixed vertical frame, the front surface of which is provided with guiding grooves for the holder, arranged at the distance apart of the walls of the holder, a horizontal transverse member arranged at the distance of the thickness of the sidewalls of the holder, the inner walls of these guides forming at the same time guides for the film to be placed in the holder, and their inner surfaces lying in the same straight line with the inner walls of the clamping devices for the film in the holder, and a movable frame the lower horizontal part of which is connected to the horizontal transverse member by means of hinge-joints, whereby said frame can be swung up in closed position to the fixed vertical frame so as to secure the holder in the said guiding grooves.

6. In a loading fixture for a rectangular film holder with clamping devices for the edges of the film, the combination of a framework comprising a base plate, uprights forming a fixed vertical frame, the front surface of which is provided with guiding grooves for the holder arranged at the distance apart of the walls of the holder, a horizontal transverse member arranged at the distance of the thickness of the side walls of the holder, the inner walls of these guides forming at the same time guides for the film to be placed in the holder, and their inner surfaces lying in the same straight line with the inner walls of the clamping devices for the film in the holder, and a movable frame the lower horizontal fillet of which is connected to the horizontal transverse member by means of hinge-joints, whereby said frame can be swung up in closed position to the fixed vertical frame so as to secure the holder in the said guiding grooves, this hinged frame being provided at its upper end near the guides for the film with bent-out tongues which with projecting tongues of the vertical frame form guiding slits for the film.

7. In a loading fixture for a rectangular film holder with clamping devices for the edges of the film, the combination of a framework comprising a base plate, uprights forming a fixed vertical frame, the front surface of which is provided with guiding grooves for the holder arranged at the distance apart of the walls of the holder, and a horizontal transverse member arranged at the distance of the thickness of the side walls of the holder, the inner walls of these guides forming at the same time guides for the film to be placed in the holder, and their inner surfaces lying in the same straight line with the inner walls of the clamping devices for the film in the holder, the horizontal transverse member supporting a sliding stop which normally lies over the lower transverse strip of the holder and hereby prevents the film from being displaced beyond this strip, and a movable frame the lower horizontal fillet of which is connected to the horizontal transverse member by means of hinge-joints, which frame can be flipped up in closed position to the fixed vertical frame as to secure the holder in the said guiding grooves, and means on said movable frame for withdrawing said sliding stop from engagement with the holder when said movable frame is swung open.

In testimony whereof I affix my signature.

OSCAR BECKER.